United States Patent [19]

Sidey

[11] Patent Number: 5,761,428
[45] Date of Patent: Jun. 2, 1998

[54] METHOD AND APARATUS FOR PROVIDING AGENT CAPABILITY INDEPENDENT FROM A NETWORK NODE

[75] Inventor: Michael J. Sidey, Middletown, N.J.

[73] Assignee: NCR Corporation, Dayton, Ohio

[21] Appl. No.: 968,646

[22] Filed: Nov. 12, 1997

Related U.S. Application Data

[63] Continuation of Ser. No. 675,954, Jul. 5, 1996, abandoned.

[51] Int. Cl.$^6$ .......................... G06F 13/00; G06F 15/177
[52] U.S. Cl. .......................... 395/200.53; 395/200.32; 395/200.5; 395/200.51; 395/200.54; 395/200.8; 395/182.01; 395/187.01; 395/670; 395/672
[58] Field of Search .................... 395/200.31–200.32, 395/200.5–200.56, 200.8, 182.01, 182.02, 187.01, 670, 672

[56] References Cited

U.S. PATENT DOCUMENTS

| | | | |
|---|---|---|---|
| 4,466,063 | 8/1984 | Segarra et al. | 395/200.56 |
| 4,858,112 | 8/1989 | Puerzer et al. | 395/200.6 |
| 5,283,869 | 2/1994 | Adams et al. | 395/200.67 |
| 5,299,313 | 3/1994 | Petersen et al. | 395/200.64 |
| 5,299,314 | 3/1994 | Gates | 395/884 |
| 5,303,344 | 4/1994 | Yokoyama et al. | 395/200.6 |
| 5,367,635 | 11/1994 | Bauer et al. | 395/200.51 |
| 5,434,976 | 7/1995 | Tan et al. | 395/200.64 |
| 5,448,724 | 9/1995 | Hayashi | 395/182.02 |
| 5,450,601 | 9/1995 | Okuda | 395/200.54 |
| 5,491,796 | 2/1996 | Wanderer et al. | 395/200.54 |
| 5,561,769 | 10/1996 | Kumar et al. | 395/200.32 |
| 5,678,006 | 10/1997 | Valizadeh et al. | 395/200.53 |

Primary Examiner—Parshotam S. Lall
Assistant Examiner—Bharat Barot
Attorney, Agent, or Firm—Ying Tuo

[57] ABSTRACT

An improved network node includes a network node autonomy portion and a sentinel autonomy portion. The network node autonomy portion can perform the tasks as a conventional network node. Both the autonomy portions contain their respective processors and MIBs. In a proper operational condition, the sentinel autonomy portion copies network management information from the MIB of the network node autonomy portion to the MIB of the sentinel autonomy portion. When faults or failures occur to the network node autonomy portion, the sentinel autonomy portion can still respond to polls from and send traps to a network management station.

19 Claims, 4 Drawing Sheets

5,761,428

METHOD AND APARATUS FOR PROVIDING AGENT CAPABILITY INDEPENDENT FROM A NETWORK NODE

This is a continuation of application Ser. No. 08/675,954 filed on Jul. 5, 1996, now abandoned.

BACKGROUND OF THE INVENTION

The present invention relates generally to network management systems, and more particularly to network management information communication in accordance with a predetermined network management protocol.

A large communication network infrastructure, such as the Internet, is composed of many smaller communication networks, such as wide and local area networks. Depending on their communication function, the network components connected to the network infrastructure can be typically divided into three categories, namely end-systems, intermediate systems and media devices. The end-systems typically include mainframes, workstations, printers and terminal servers. The intermediate systems typically includes routers for providing connectivity between (among) wide area networks or between (among) local networks using different protocols. The media system includes bridges, hubs and repeaters. The bridges, hubs and repeaters can be used to connect two or more local area network sections together. The hubs and repeaters can also be used to form a local area network section. From a broad point of view, all network components can be considered as network nodes, which communicate with each other according to predetermined protocols, via local area section(s), local area networks, wide area network(s), or the internet, depending on the communication path required.

To monitor network components, network management systems are provided to collect and maintain the information, including: (1) what nodes are connected to a communication network; (2) what the topology is for a communication network; (3) what each node is, e.g., a computer, a router, a printer, etc.; (4) the operation status of each node; (4) potential problems of a communication network, (5) abnormal conditions for a communication network; and so on.

Since the network components and supporting network software are manufactured and developed by many vendors, network management system standards are needed to ensure the compatibility of the network components and network applications that support the network components. Simple Network Management Protocol (SNMP) is such a network system management standard.

A network management system includes at least one network management station and one or more managed nodes. The management information is exchanged between the management station and the managed nodes. The definition of a unit of network management information is called a managed object. A collection of related managed objects is defined in a document called the Management Information Base (MIB). MIB can be located in a managed node and accessed via a network management protocol, such as SNMP. The management station runs a network management program, and each of the managed nodes contains an agent that is capable of exchanging network management information with the management station.

In a network management system, each managed node is viewed as having a plurality of "variables." By reading (polling) the value of these variables from a managed node, the management station can monitor the managed node. By changing (writing) the value of these variable in a managed node from a management station, the management station can control the managed node.

One approach for a management station to monitor the abnormal operation condition of a managed node is called as traps. With the trap-based approach, when an extraordinary event occurs (such as a link going down), the agent in the managed node sends a trap to the management station (assuming that the device has not crashed and that there is a path through which the management station can be reached).

Another approach for a management station to monitor the abnormal operation condition of a managed node is called trap-directed polling. When an extraordinary event occurs, the agent in the managed node sends a signal, a simple trap, to the management station. The management station is then responsible to initiating further interactions with the agent in the managed node to determine the nature and extent of the problem.

More details about SNMP is elaborated by *The Simple Book, An Introduction to Internet Management* (second edition by Marshall T. Rose). Applicant hereby incorporates this book into the present application by reference.

One serious problem with the conventional approaches is when a managed node fails suddenly, by software lockup, by circuit failure, or power failure, a network administrator may not be able to collect information, such as the nature of the failure, the severity of the failure, the specific time of the failure, its cause, etc. This information can be very useful to the network administrator to make an arrangement to restore the failed managed node.

For example, if the agent in the managed node is unable to send a trap at all to a management station due to the node failure, the management station will not be able to notice the failure of the managed node. When the management station polls the failed managed node, trying to get access to the MIB associated with that failed managed node, it will receive no answer. Or even if it is able to send out a simple trap, when the agent in the managed station is unable to interactively respond to the management station due to the failure, the management station will be still unable to get access to the failed managed node.

More specifically, in the case of power failure to a managed node, it is not possible for an adjacent node (such as a hub or repeater) to make a data path verification and link integrity test to the failed managed node. This test would be useful to the network administrator since it can provide the information that the data path may have failed, rather than the managed node itself. According to the test information, the network administrator can determine what type repair personnel should be dispatched.

Therefore, there is a need to provide an improved network node that is able to communicate with a network management station when the agents in the network node cannot respond to the network management station.

There is an another need to provide an improved network node that is able to send network management information reflecting points of failure of the network node.

The present invention meets these needs.

SUMMARY OF THE INVENTION

In one aspect, the invention provides a network node that is connected to a network. The network node comprises:

a first portion including a processing unit and a first storage area for storing network management information reflecting operational status of said first portion; and a second portion including a processing unit and a second storage area for storing network management information reflecting operational status of said first portion;

wherein said second portion sends said network management information stored in said second storage area to said network when said first portion is unable to communicate with said network.

In another aspect, the invention provides a network node that is connected to a network. The network node comprises:

a first portion including a processing unit, said first portion being capable of independently performing predetermined tasks; and a second portion including a processing unit;

wherein said second portion communicate with said network when said first portion is unable to communicate with said network.

The present invention also provides respective methods corresponding to the two aspects above described.

These and other features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
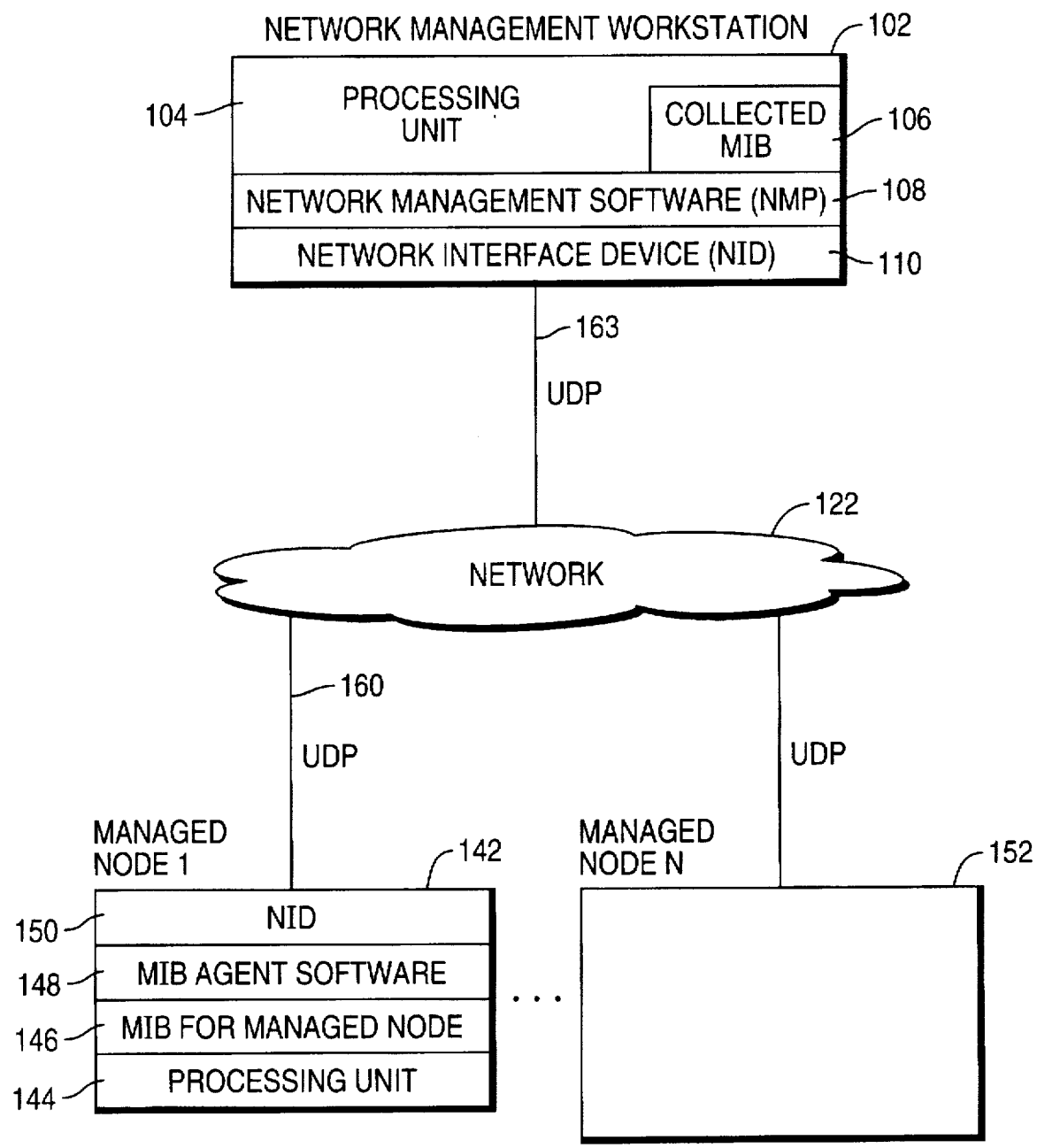
FIG. 1 shows a communication network that connects a network management station and a plurality of managed nodes.
Figure 2:
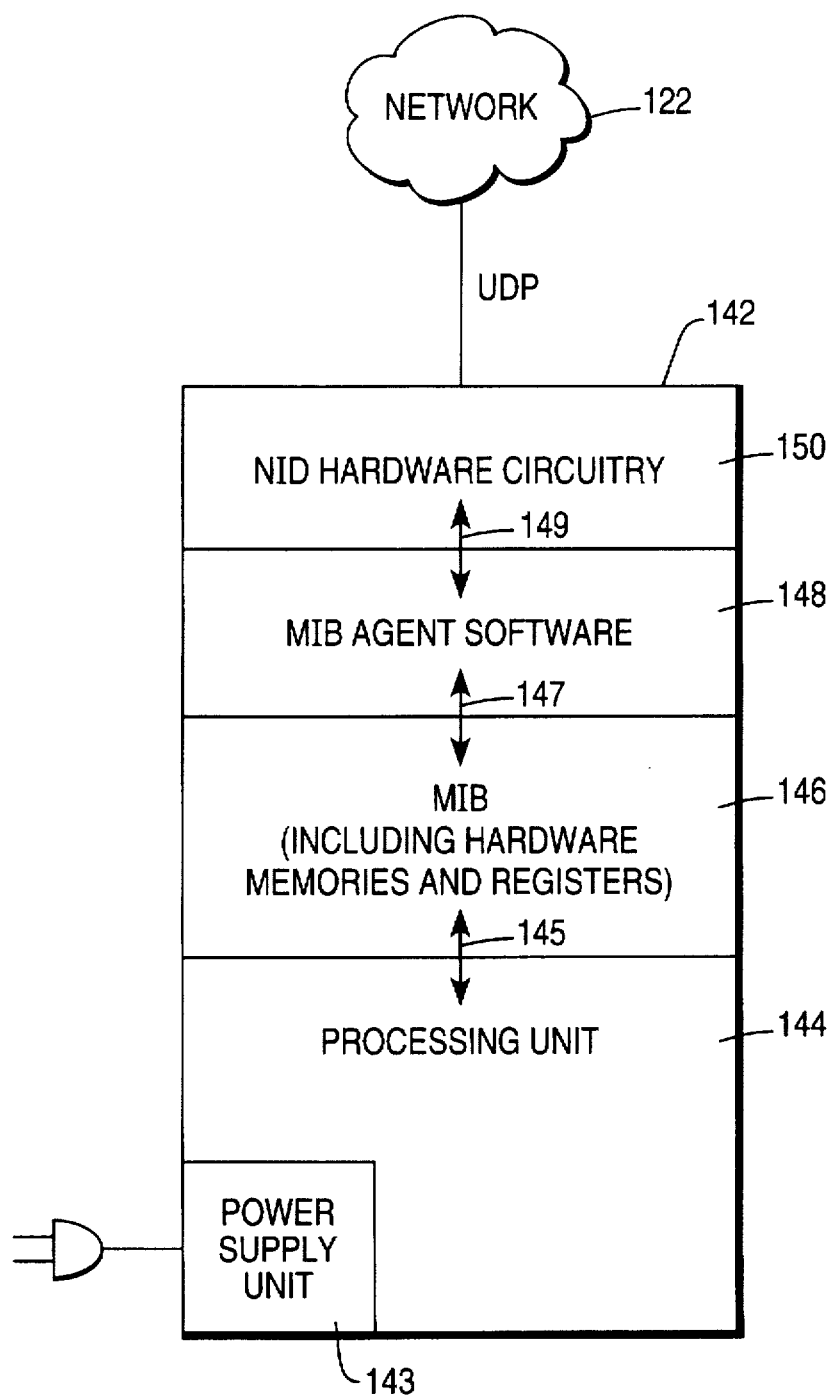
FIG. 2 is the block diagram of one managed node shown in FIG. 1.

To better appreciate the features and advantages of the present invention, it is helpful to first describe the structure of the conventional managed nodes as shown in FIGS. 1 and 2.

Referring to FIG. 1, there is shown a communication network 122, which connects a network management station 102 via network link 163 and a plurality of conventional managed nodes (network nodes) numbered from Managed Node 1 (142) to Managed Node n (152). Managed node 1 (142) is connected to communication network 122 via network link 160. Each of the managed nodes (network nodes) is able perform desired tasks. For example, a user terminal can run window operating system and various user applications; a router can receive data packets from a network node and sends them to another network node according to network addresses associated with the data packets.

As shown in FIG. 1, network management station 102 comprises a processing unit 104 including hardware circuitry and system software for running the network management station, collected MIB 106 containing the network management information collected from the managed nodes, network management software 108, and network interface device (NID) 110.

Network management software 108 is able to perform the functions required by SNMP protocol, such as: making discoveries and interrogations of agents and MIB information on the respective managed nodes; polling managed nodes; directing managed nodes to forward traps; and assessing and compiling with other network management stations, of which it may be part of a coordinated multitude of such management stations.

The function of NID 110 in the network management workstation will be described in the below, together with that of NID 150 in managed node 142.

Processing unit 104 is able to control the overall operation of network management station 102.

In operation, network management station 102 can get access to and collect information from MIBs in managed nodes, via network 122 according to UPD (User Datagram Protocol) protocol.

Described as a representative of the conventional managed nodes, node 142 comprises a processing unit 144 including computer hardware circuitry and system software for running the managed node, MIB 146 for managed node 142, MIB agent software 148, and NID 150.

MIB 146 is able to store network management information in the format required by SNMP.

MIB agent software 148 is able to read and write MIB 146, and perform the functions of an agent required by SNMP. In general, MIB agent software 148 obtains network management information by invoking routine software that reads from various memory locations maintained by an operating system (such as kernel in UNIX operating system). MIB agent software 148 then writes the network management information into MIB 146. It is possible that other software programs running on processing unit 144 can be granted restricted access to the network management information stored in MIB 146. For example, the kernel of UNIX operating system can directly write to specific portion of MIB 146.

NID 150 (also NID 110) is able to send messages in accordance with one or more network protocols over a specific type of physical medium, such as IEEE 802.3 ethernet, 10Base5, or 10BaseT allowable cables. NID 150 (or NID 110) allows its associated network node to communicate with other NIDs over network link.

Referring to FIG. 2, there is shown the block diagram of managed node 142 of FIG. 1 in greater detail.

As shown in FIG. 2, a power supply unit 143 provides power supply for all components in managed node 142, including processing unit 144, MIB 146, MIB agent software 148 and NID hardware circuitry 150. MIB 146 can use hardware memories and registers to store network management information.

Arrow 145 indicates MIB data flow between processing unit 144 and MIB 146; arrow 147 indicates MIB data flow between MIB agent software 148 and MIB 146; arrow 149 indicates MIB data flow between NID and MIB agent software 148. The MIB data flows are controlled by processing unit 144 in time-sharing fashion.

In FIG. 2, the system and application software running on managed node 142, MIB 146, and MIB agent software 148 shares processing unit 144. In another words, processing unit 144 has to execute the system and application software, manage MIB 146, and execute MIB agent software 148, in time-sharing fashion. The scheme shown in FIG. 2 certainly places a heavy workload on processing unit 144. For example, MIB agent software 148 collects the network management information within managed node 142 and then assimilates it into MIB 146 (which is resided in a portion of memory managed by processing unit 144); it also responds to any requests to read from and write into MIB 146 by network management software 108 during a poll; it has to recognize any of the events for which it has been instructed to generate a trap, subsequently to generate that trap, then to follow up that trap, then to respond to any additional polls to request for further details of that trap. Processing unit 144 has to participate in all these activities.

In FIG. 2, any common failures (such as processor failure, running out free memory or hard disk space, power failure, system or application software failure, etc.) on processing unit 144 will result in the failure (or malfunctioning) of MIB 146 and/or agent software 148.

Figure 3A:
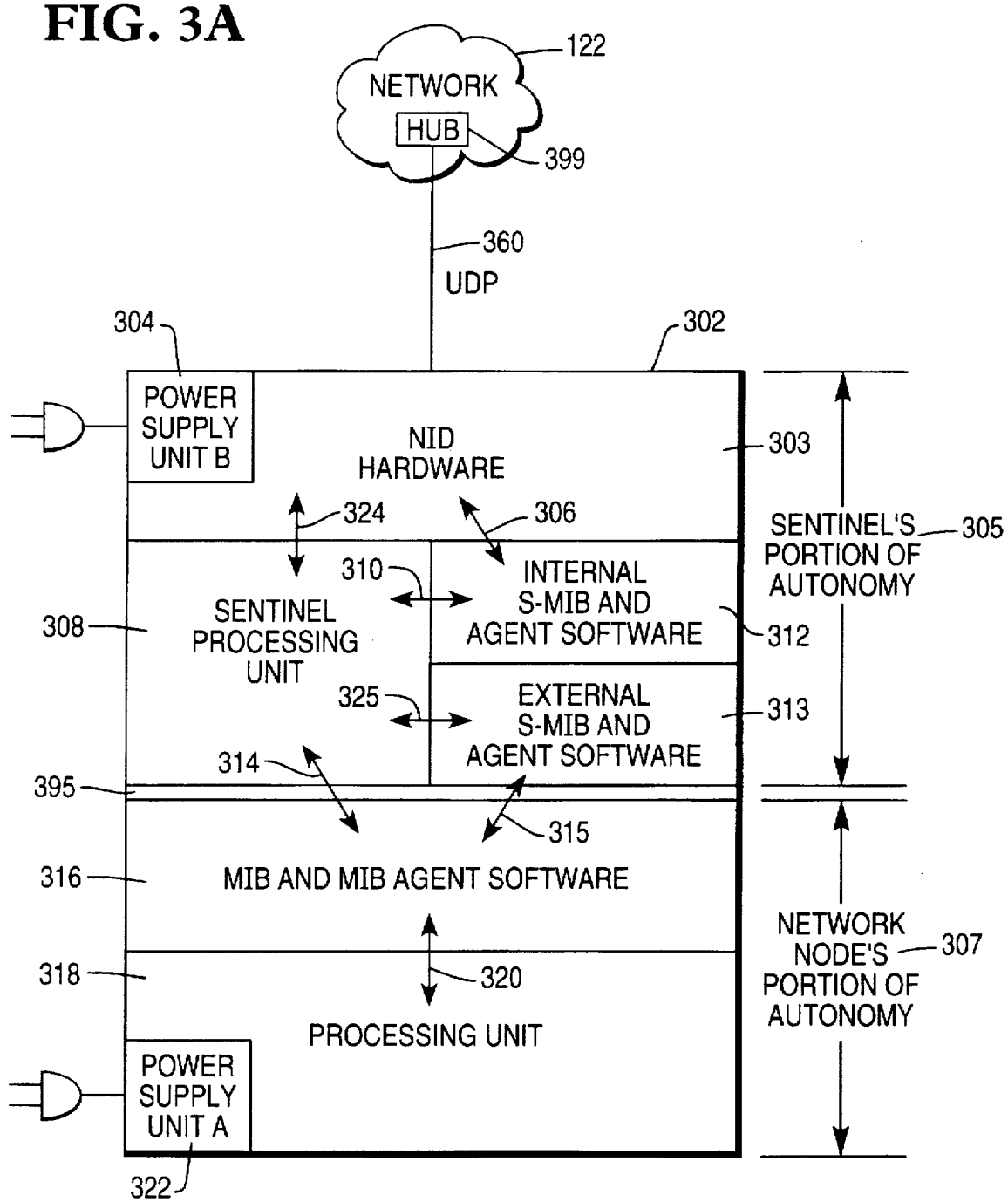
FIG. 3A is a block diagram of a managed node in accordance with one embodiment of the present invention.

Referring to FIG. 3A, there is shown a block diagram of a managed node, in accordance with one embodiment of the present invention.

As shown in FIG. 3A, managed node 302 is divided into two autonomy portions, namely sentinel's portion of autonomy 305 and network node's portion of autonomy 307.

Network node's portion of autonomy 307 comprises network node processing unit 318 including computer hardware circuitry and system software for running managed node 302, MIB and agent software 316, and power supply unit 322. Network node 302 can be different types of network nodes, such as router, bridge, hub, repeater, mainframe, workstation, input/output device, server, etc. Thus, network node portion of autonomy 307 can independently perform predetermined functions (or tasks) as a router, a bridge, a hub, a repeater, a mainframe, a workstation, an input/output device, or a server.

Sentinel's portion of autonomy 305 comprises NID hardware 303, sentinel processing unit 308 and power supply unit 304. Sentinel's portion of autonomy 305 also includes its own MIB called Sentinel MIB (S-MIB) and agent software. The S-MIB is composed two portions: (1) internal S-MIB and respective agent software 312, and (2) external S-MIB and respective agent software 313. The internal S-MIB provides the information reflecting health and operational status of autonomy portion 305; the external S-MIB provides the information reflecting health and operational status of autonomy portion 307.

Between sentinel's portion of autonomy 305 and network node's portion of autonomy 307, coupled is an isolation circuitry 395, which is capable of preventing a fault in one portion of autonomy from causing disruption of the other portion of autonomy. The isolation circuitry includes mechanical or solid state relays, fail-safe digital integrated circuits, or tri-state buffer integrated circuits.

As indicated by arrows 310 and 325, sentinel processing unit 308 is able to operate on (read from or write to) internal S-MIB 312 and external S-MIB 313 respectively.

As indicated by arrow 314, sentinel processing unit 308 is able to communicate with MIB and MIB agent software 316, so that the sentinel processing unit can copy the information from the MIB to external S-MIB 313. If the MIB or MIB agent software fails, the copy in external S-MIB 313 is available as historical data about autonomy portion 307. When sentinel processing unit 308 detects a fault condition on autonomy portion 307, it can store fault condition into external S-MIB, and independently send the fault condition to a designated network management station even when network node's portion of autonomy 307 has totally failed or is being repaired. For example, a condition such as software loading or a system boot up operation can be monitored by a designated network management station, so that the network administrator can determine that repair actions are underway.

In a proper operational condition, sentinel processing unit 308 collects network management information from MIB and MIB agent software 316 and sends it to a network management station, in response to poll requests. Sentinel processing unit can also send traps to the network management station. In a fault condition, sentinel processing unit 308 collects network management information from external SMB 313 and sends it to the network management station. Also in the fault condition, sentinel processing unit 308 can respond to polls from and send traps to the network management station.

As indicated by arrow 320, managed node processing unit 318 can operate upon MIB 316. As indicated by arrow 315, when large volume of data needs to be duplicated, processing unit 318 can copy the data from MIB 316 to external S-MIB 313.

In FIG. 3A, when managed node 302 is in a proper operational condition, the information in MIB 316 and external S-MIB 313 is consistent with each other. When network node's portion of autonomy 307 is in an abnormal operational condition, the information in MIB 316 and external S-MIB 313 may not be consistent with each other. By detecting the information discrepancy between MIB 316 and S-MIB 313, the flaws in managed node 302 are more apparent. By providing a time stamp on each data item (object) in MIB 316 and S-MIB 313, the relative age of each data item can be readily shown, so that the inconsistencies between MIB 316 and S-MIB 313 can be used to diagnose the network nodes' portion of autonomy 307.

In a proper operational condition, power supply unit A 322 is able to provide power supply to all components in managed node 302. In the case when power supply unit A 322 fails, power supply unit B 304 is able to provide power supply to sentinel's portion of autonomy 305.

In the embodiment shown in FIG. 3A, sentinel's portion of autonomy 305 and network node's portion of autonomy 307 shares NID hardware 303, a common network addresses and a common data path to network 122. The data or command (read or write from a network management station) for managed node 302 or for sentinel's portion of autonomy 307 can be distinguished by an address field within the data transmissions. As a result, a network management station can get access to MIB 316 in compliance with existing network management protocols.

Advantageously, the invention as shown in FIG. 3A can provide network management information that is helpful to determine point of failure on network node 302. For example, a network management station can perform tests on network link 360, even if network node's portion of autonomy 307 has been failed. Specifically, the network management station sends a test message to sentinel's portion of autonomy 305 over network link 360. If sentinel's portion of autonomy 305 is in proper condition, sentinel processing unit 308 sends the test message back to the network management, which verifies that network link 360 and NID 303 are in proper operational conditions. With a conventional network node, the network link test would not be able to differentiate between the failure of a network link, or the failure of the network node itself. This is so because when a conventional network node fails, it will not respond to any message even if its network link is in proper operational condition. Also, when network node's portion of autonomy 307 has failed, sentinel's portion of autonomy 305 can still respond to polls from a network management station and send the information stored in external S-MIB. Such information is helpful to determine the point of failure. By same principle, when a network node is connected to a hub device 399, as shown in FIG. 3A, the hub device can be made to perform the network link test.

Figure 3B:
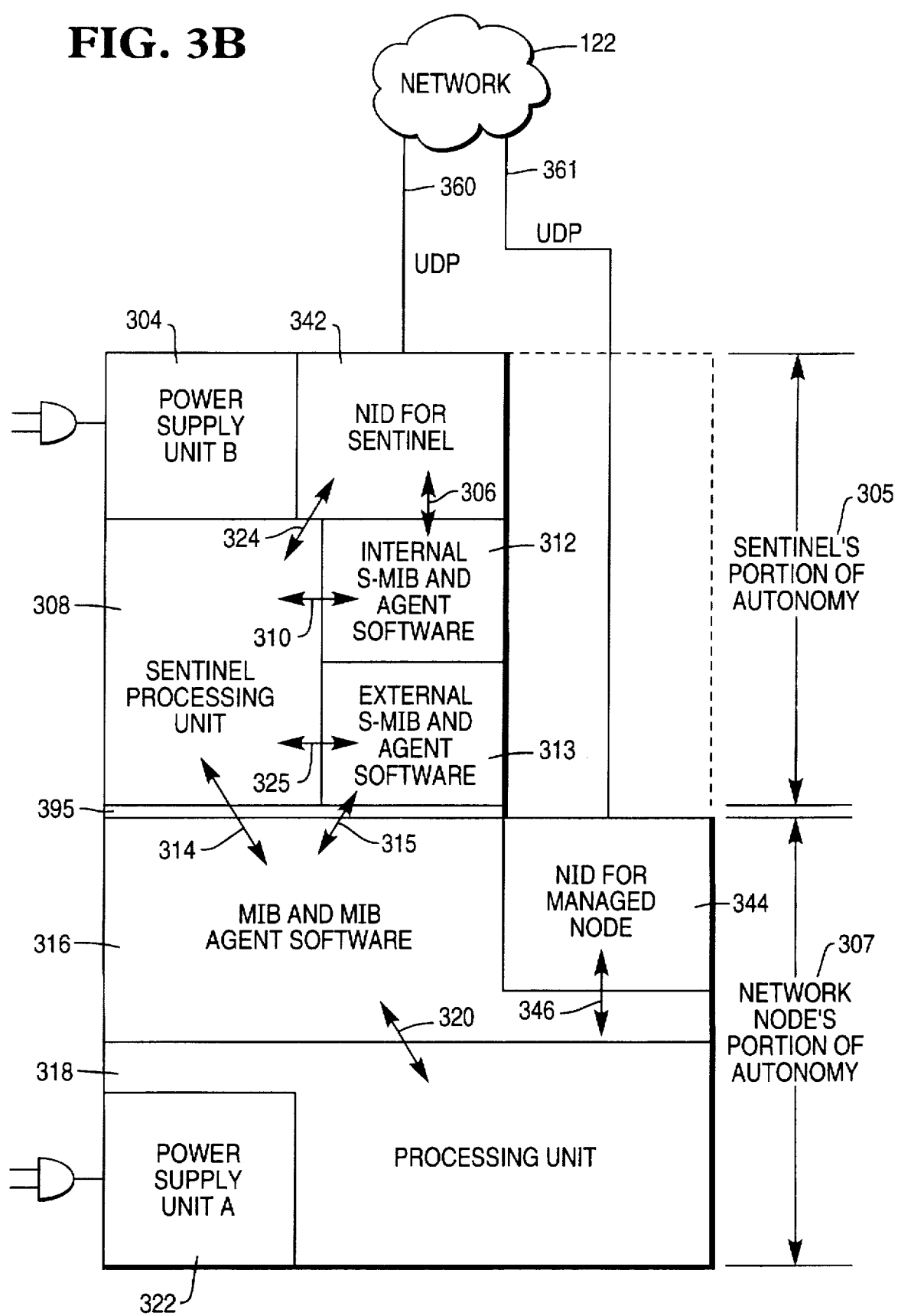
FIG. 3B is a block diagram of a managed node in accordance with another embodiment of the present invention.

Referring to FIG. 3B, there is shown a block diagram of a managed node, in accordance with another embodiment of the present invention.

As shown therein, structurally the embodiment of FIG. 3B is similar with that shown in FIG. 3A, except that sentinel's portion of autonomy 305 and network node's portion of autonomy 307 have their own separate NIDs 342 and 344 respectively. NIDs 342 and 344 have different network addresses.

As indicated by arrow 346, MIB and MIB agent software is able to communicate with NID 344.

In FIG. 3B, when network node's portion of autonomy 307 is in proper operational condition, autonomy 307 portion is able to communicate with a network management station using NID 344 via network link 361. When network node's portion of autonomy 307 has failed, sentinel's portion of autonomy 305 is able to communicate with the network management station using NID 342 network link 360.

One advantage of the embodiment shown in FIG. 3B is that the NID for sentinel is separate from the NID for the managed node. This provides two separate network links (360 and 361), thus allowing to get access to two distinct purpose networks with different protocols or security considerations. Another advantage of the embodiment shown in FIG. 3B is that isolation circuitry 395 between two autonomy portions 305 and 307 is simplified.

In the embodiments shown in FIGS. 3A and 3B, sentinel's portion of autonomy 305 can communicate with a network management station via network 122 when network node's portion of autonomy 307 is busy or does not want to be interrupted. This feature provides the responsiveness of network management information communication between a network management station and a managed network node.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A network node being connected to a network, comprising:
   a first portion, located in the network node, including a first processing unit, a first agent software, and a first management data information base (MIB) for storing information reflecting status of said first portion; and
   a second portion, located in the network node, including a second processing unit, a second agent software, and a second management information base (MIB) for storing information reflecting status of said first portion, wherein the information stored in said first MIB is periodically copied into said second MIB when said first portion is in a normal operational condition;
   wherein said second portion communicates with the network when said first portion is in a fault condition and unable to communicate with the network.

2. The network node of claim 1, further comprising: circuitry for isolating said first portion from said second portion.

3. The network node of claim 1, said second portion being able to respond to a control message and generate a reporting message when said first portion is unable to communicate with the network.

4. The network node of claim 1, said second processing unit having access to said first MIB.

5. The network node of claim 1, said first portion being capable of independently performing predetermined tasks.

6. The network node of claim 1, said second portion further comprising a third management information base (MIB) for storing information reflecting status of said second portion.

7. The network node of claim 1, said first portion having a power supply unit and said second portion having a power supply unit separate from said power supply unit in said first portion.

8. The network node of claim 1, the network node further including a network interface circuitry for connecting the network node to the network.

9. The network node of claim 1, said first portion being identified by a first network address and said second portion being identified by a second network address.

10. A network node being connected to a network, comprising:
    a first portion, located in the network node, including a first processing unit for processing network management information that is stored in said first portion; and
    a second portion, located in the network node, including a second processing unit for processing network management information that is stored in said second portion, wherein said second processing unit periodically copies the network management information from said first portion to said second portion when said first portion is in a normal condition;
    wherein said second portion communicates with the network based on the network management information stored in said second portion, when said first portion is in a fault condition and unable to communicate with said network.

11. The network node of claim 10,
    said first portion including a first storage area for storing the network management information in said first portion; and
    said second portion including a second storage area for storing the network management information in said second portion.

12. The network node of claim 10, said second portion being able to respond to a control message and generate a reporting message when said first portion is in a fault condition and unable to communicate with the network.

13. The network node of claim 10, said first processing unit executing programs to perform predetermined tasks.

14. A method in using with a network node being connected to a network, comprising the steps of:

(a) setting a first portion and a second portion into the network node;

(b) setting a first processing unit, a first agent software, and a first management information base (MIB) in the first portion, and setting a second processing unit, a second agent software, and a second management information base (MIB) in the second portion;

(c) periodically copying information from the first MIB to the second MIB when the first portion is in a normal condition; and (d) by the second portion, communicating with the network when the first portion is in a fault condition and unable to communicate with the network.

15. The method of claim 14, said step (d) responding to a control message and generating a reporting message when the first portion is in a fault condition and unable to communicate the network.

16. The method of claim 14, further comprising the step of:

in the second portion, setting a third management information base (MIB) for storing information reflecting status of the second portion.

17. In using with a network node being connected to a network, the network node having a first portion and a second portion, a method comprising the step of:

(a) setting a first processing unit and storing network management information for reflecting status of the first portion, and setting a second processing unit and storing network management information for reflecting status of the first portion;

(b) periodically copying network management information stored in the first portion to the second portion when the first portion is in a normal condition;

(c) by the first portion, processing the network management information stored in the first portion and communicating with the network when the first portion is in a normal condition; and (d) by the second portion, processing the network management information stored in the second portion and communicating with the network when the first portion is at a fault condition and unable to communicate with the network.

18. The method of claim 17, further comprising the step of:

by the second portion, responding to a control message and generating a reporting message when the first portion is in a fault condition and unable to communicate with the network.

19. The method of claim 18 further comprising the step of:

by said second portion, sending the reporting message to the network based on the network management information stored in the second portion to the network when the first portion is in a fault condition and unable to communicate with the network.

* * * * *